(12) United States Patent
Jansen et al.

(10) Patent No.: US 6,293,627 B1
(45) Date of Patent: Sep. 25, 2001

(54) ALL WHEEL DRIVE POWER BUGGY

(75) Inventors: Darrell D. Jansen; Michael T. Vickers, both of Boise, ID (US)

(73) Assignee: Whiteman Industries, Inc., Boise, ID (US)

( * ) Notice: Subject to any disclaimer, the term of this patent is extended or adjusted under 35 U.S.C. 154(b) by 0 days.

(21) Appl. No.: 09/503,667

(22) Filed: Feb. 14, 2000

(51) Int. Cl.$^7$ ...................................................... B60P 1/00
(52) U.S. Cl. ..................... 298/1 C; 298/22 R; 180/212; 180/305
(58) Field of Search .................... 298/1 C, 7, 22 R; 180/212, 242, 247, 305

(56) References Cited

U.S. PATENT DOCUMENTS

| | | | |
|---|---|---|---|
| Re. 33,131 | 12/1989 | Morrison | 298/1 H |
| 2,424,670 | 7/1947 | Shimer | 298/1 C |
| 2,427,132 | 9/1947 | Godbey | 298/1 C |
| 2,530,574 | 11/1950 | Getman | 298/1 C |
| 2,674,328 | 4/1954 | Searls | 180/26 |
| 2,820,524 | 1/1958 | Bear | 180/52 |
| 2,887,339 | 5/1959 | Reid | 298/1 C |
| 2,942,677 | 6/1960 | Gray | 180/26 |
| 3,021,625 | 2/1962 | Stasse | 298/1 C |
| 3,292,805 | 12/1966 | Thwaites | 298/1 C |
| 3,826,326 | 7/1974 | Blair | 180/25 |
| 4,645,264 | 2/1987 | Morrison | 298/1 H |
| 4,986,387 | 1/1991 | Thompson et al. | 180/212 |
| 5,360,259 | 11/1994 | Lemberger | 298/19 V |
| 5,682,958 | 11/1997 | Kalhorn et al. | 180/308 |
| 6,155,648 | 12/2000 | Dombek et al. | 298/1 C |

*Primary Examiner*—Stephen T. Gordon
(74) *Attorney, Agent, or Firm*—Frank J. Dykas; Robert L. Shaver

(57) ABSTRACT

A motorized dump-type vehicle is provided having a chassis frame, an engine mounted on said frame, a dump container pivotally mounted on the front of said frame and a hydraulic system enabling said container to be raised and lowered by a hydraulic cylinder and said vehicle to be driven in either forward or reverse directions using its front wheels. Additionally, as needed, the vehicle can be switched into all-wheel-drive by hydraulically driving the vehicle's rear wheel(s) which are by default undriven.

7 Claims, 4 Drawing Sheets

ALL WHEEL DRIVE POWER BUGGY

BACKGROUND OF THE INVENTION

1. Field of the Invention

The present invention generally relates to motorized vehicles, and more particularly to concrete power buggies.

2. Background Information

As disclosed in U.S. Pat. No. 4,645,264, the teachings of which are hereby incorporated by reference, concrete construction and other work requiring on-the-job transport of heavy materials from one location to another has brought about the development of a variety of relatively-small, load-carrying vehicles capable of moving on the job site with relatively small but often very heavy loads of material. For example, a frequent need is to load a quantity of concrete at a first location, transport such concrete to a second location and then dump the contents for spreading and screeding operations at the second location.

In concrete work, such a vehicle is often referred to as a "concrete buggy." Such vehicles may also be referred to as a dump truck or power-driven wheelbarrow. Some of such vehicles are of the walk-behind type while others are of the step or seat-riding type. The load which is carried by a container called a "skip," "hopper," "pan," or "dump box" is conventionally raised and lowered by a hydraulic piston as in U.S. Pat. Nos. 2,424,670 or 2,427,132. A front pair of single or dual wheels is conventionally driven by a differential and transmission as in U.S. Pat. No. 2,427,132.

Other vehicles have trinary wheel means wherein two separate front wheel means each having single or dual wheels proceed a solitary single or dual rear wheeled means. Typically, the solitary wheeled means supports the rear of the vehicle and is adapted for rotating around a vertical axis for the purpose of steering the vehicle and sometimes with use of a steering mechanism as in U.S. Pat. No. 2,427,132, while the front wheel means supports the front of the vehicle. The trinary-type vehicle is also shown in U.S. Pat. Nos. 4,986,387 and Pat. No. Re. 333,131.

Other patents describe vehicles with trinary wheel means having a powered solitary rear wheel means, including U.S. Pat. No. 2,674,328 (Searls), U.S. Pat. No. 2,820,524 (Bear), U.S. Pat No. 2,942,677 (Gray), and U.S. Pat. No. 3,826,326 (Blair).

However, none of these patents describe a motorized dump-type vehicle having powered front wheels and the ability to engage the vehicle's rear wheel(s) when needed for added traction or control.

A concrete buggy which is filled with concrete tends to have a center of gravity shifted towards the center of the vehicle, towards the front wheels of the buggy. After the buggy dumps its load of concrete, this center of gravity shifts rearward, towards the rear wheel(s) and engine of the buggy. This shift of the center of gravity leaves the front end light, occasionally causing problems in getting traction with the front wheels, particularly where the soil is wet, loose or sandy.

It is one object of the present invention to provide a motorized dump-type vehicle for on-the-job transporting of concrete or other materials, the vehicle having at least two powered front wheels and the ability to power at least one rear wheel for added traction and control, as needed.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The present invention is a motorized dump-type vehicle for on-the-job transporting of concrete or other materials. The preferred embodiment of the present invention has a chassis frame having front and rear ends, and left and right sides. An engine is mounted near the rear end of the frame.

At least one front hydraulic drive means is secured to the frame, preferably near the front end of the frame. The vehicle has a left wheel means located on the left side of the frame front end. This left wheel means is drivingly connected to at least one front hydraulic drive means thereby enabling the left wheel to be driven. The vehicle also has a right wheel means located on the right side of the frame front end. The right wheel means is drivingly connected to at least one front hydraulic drive means thereby enabling the right wheel means to be driven.

The vehicle has an attached open top dump container. This container is preferably supported on the frame and has a bottom front end portion which is pivotally mounted on the front end of the frame. The vehicle has at least one hydraulic piston/cylinder having one end pivotally mounted on the frame and the opposite end pivotally connected to the container thereby enabling the rear end of the container to be raised and lowered.

The vehicle further has at least one rear hydraulic drive means secured to the frame, preferably at the rear end of the frame. At least one rear wheel means is preferably mounted below and centrally of the rear end of the frame, thereby enabling the rear wheel means to swivel about a vertical axis for steering the vehicle. The rear wheel means is drivingly connected to the rear hydraulic drive means thereby enabling the rear wheel means to be driven.

The vehicle further has a hydraulic fluid tank. This tank has an input connection for receiving and storing hydraulic fluid and an output connection for withdrawing fluid to be pumped. An adjustable oil pump is additionally mounted on the vehicle frame and drivingly connected to said engine, this pump having a pump input connection to the output connection of the tank and a pump output connection.

Finally, the vehicle further has a hydraulic valve and conduit system connected between the pump output connection and the tank input connection including a first lever-controlled valve connected by conduit to the piston/cylinder for raising and lowering the container, second lever-controlled valve connected by conduit to the front hydraulic drive means for forward and reverse driving of the left and right wheels, and a third lever-controlled valve connected by conduit to the rear hydraulic drive means for engaging or disengaging the rear wheel means.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
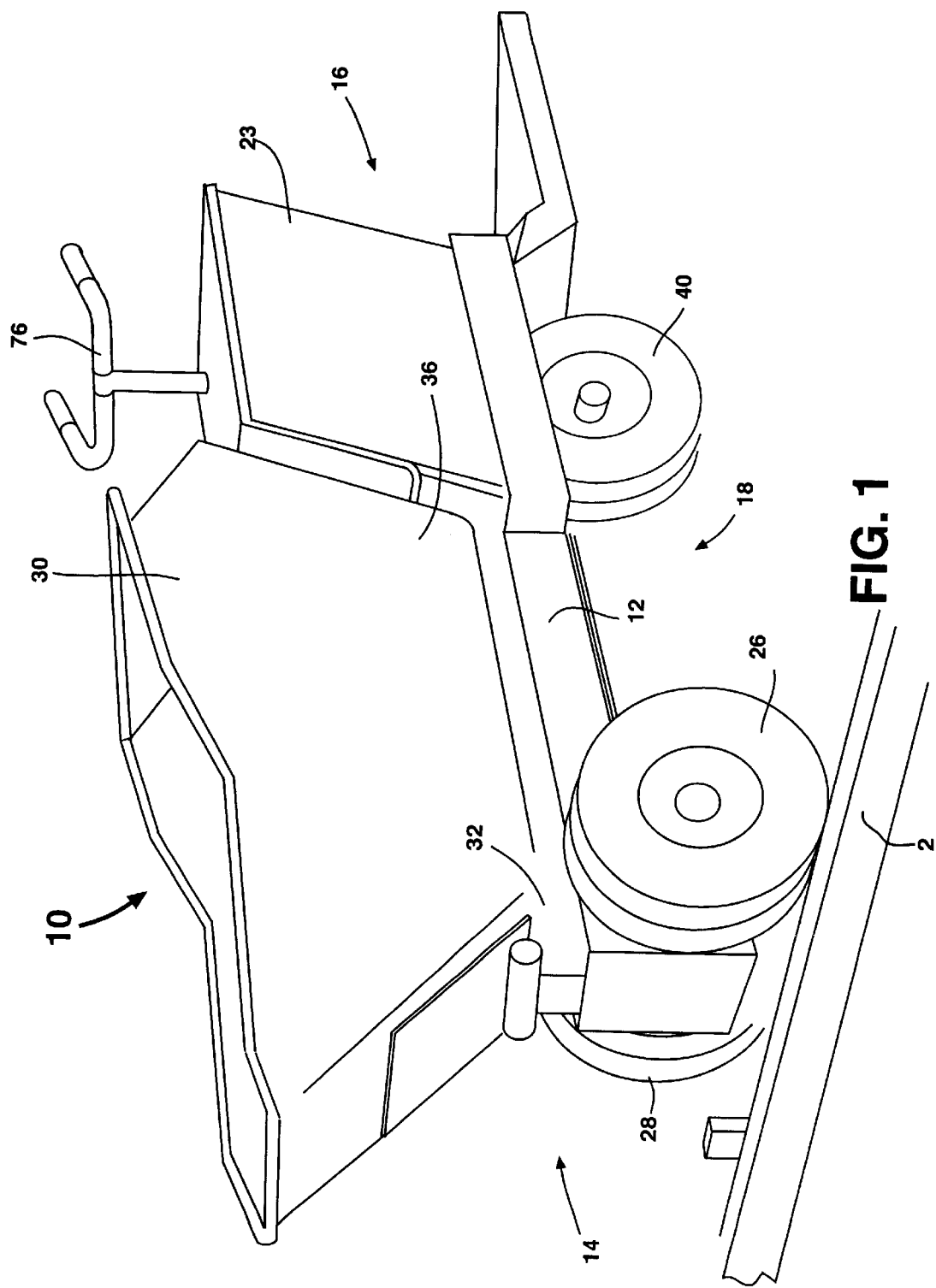
FIG. 1 is a perspective, environmental view of one embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Making reference initially to FIG. 1, the preferred embodiment of the present invention vehicle 10 comprises a motorized dump-type vehicle for on-the-job transporting of concrete or other materials, wherein the vehicle 10 can transport and dump concrete in a form 2, for instance. The vehicle 10 has a chassis frame 12 defining a front end 14, a rear end 16, a left side 18 and a right side 20 (not shown). Mounted at the rear end 16 of the chassis frame 12 is an engine, preferably a gasoline powered engine which may or may not be enclosed in a housing 23.

Pivotally mounted at the front end 14 of the chassis frame 12 is an open top dump container 30. This pivot is located at the bottom front end 32 of the open top dump container 30. The rear end 36 of this open top dump container 30 can be raised and lowered by a hydraulic piston/cylinder (not shown) to the open top dump container 30, thereby allowing the open top dump container 30 to be dumped.

The vehicle 10 has a left wheel means 26 extending from the left side 18 of the front end 14 of the chassis frame 12. This left wheel means 26 is for contacting a ground surface. This left wheel means 26 may comprise one or more rubber tires, with the preferred embodiment shown in FIG. 1 showing a pair of wheels with tires.

The vehicle 10 has a right wheel means 28 extending from the right side 20 of the front end 14 of the chassis frame 12. This right wheel means 28 is for contacting a ground surface. This right wheel means 28 may comprise one or more rubber tires, with the preferred embodiment shown in FIG. 1 showing a pair of wheels with tires.

The vehicle 10 further has at least one front hydraulic drive means 24 (shown in FIGS. 2, 3, and 4) secured to the chassis frame 12. This hydraulic drive means 24 drivingly connects to the wheel means 26, 28 thereby enabling the wheel means 26, 28 to be driven. In the preferred embodiment, a pair of hydraulic drive means 24, 38 are used, with the first hydraulic drive means 24 driving the left wheel means 26, and with the second hydraulic drive means 38 driving the right wheel means 28. The preferred first and second hydraulic drive means 24, 38 are hydraulic motors. The drive means 24, 38 are preferably controlled by control or directional valves.

The vehicle 10 has at least one rear wheel means 40 which is mounted below and preferably centrally of the rear end 16 of the chassis frame 12. This rear wheel means 40 is mounted on a pivotal support means which enables the rear wheel means 40 to swivel about a vertical axis which passes through the support means for steering the vehicle 10. This arrangement is standard for concrete buggies and allows the vehicle's operator to steer the vehicle 10 by use of a handlebar 76 or other steering device by swiveling the rear wheel means 40 on its vertical axis to change the direction of travel of vehicle 10. In the preferred embodiment, the rear wheel means 40 is a single wheel means comprising pair of wheels with tires, however also envisioned with the use of two separate wheel means in lieu of a single wheel means.

The rear wheel means 40 could be a pair of wheels located at the corners of the rear portion of the frame, a single wheel in the center of the rear of the frame, a pair of wheels at the center of the frame or any configuration in which the rear wheels (remote from the dumping end) are the steering wheels.

The vehicle 10 further comprises a rear or third hydraulic drive means 41 (shown in FIGS. 2–4) secured to the chassis frame 12. This hydraulic drive means 41 drivingly connects to the rear wheel means 40 thereby enabling the rear wheel means 40 to be driven. The preferred third hydraulic drive means 41 is a hydraulic motor. The drive means 41 is preferably controlled by valve through use of a control lever.

Figure 2:
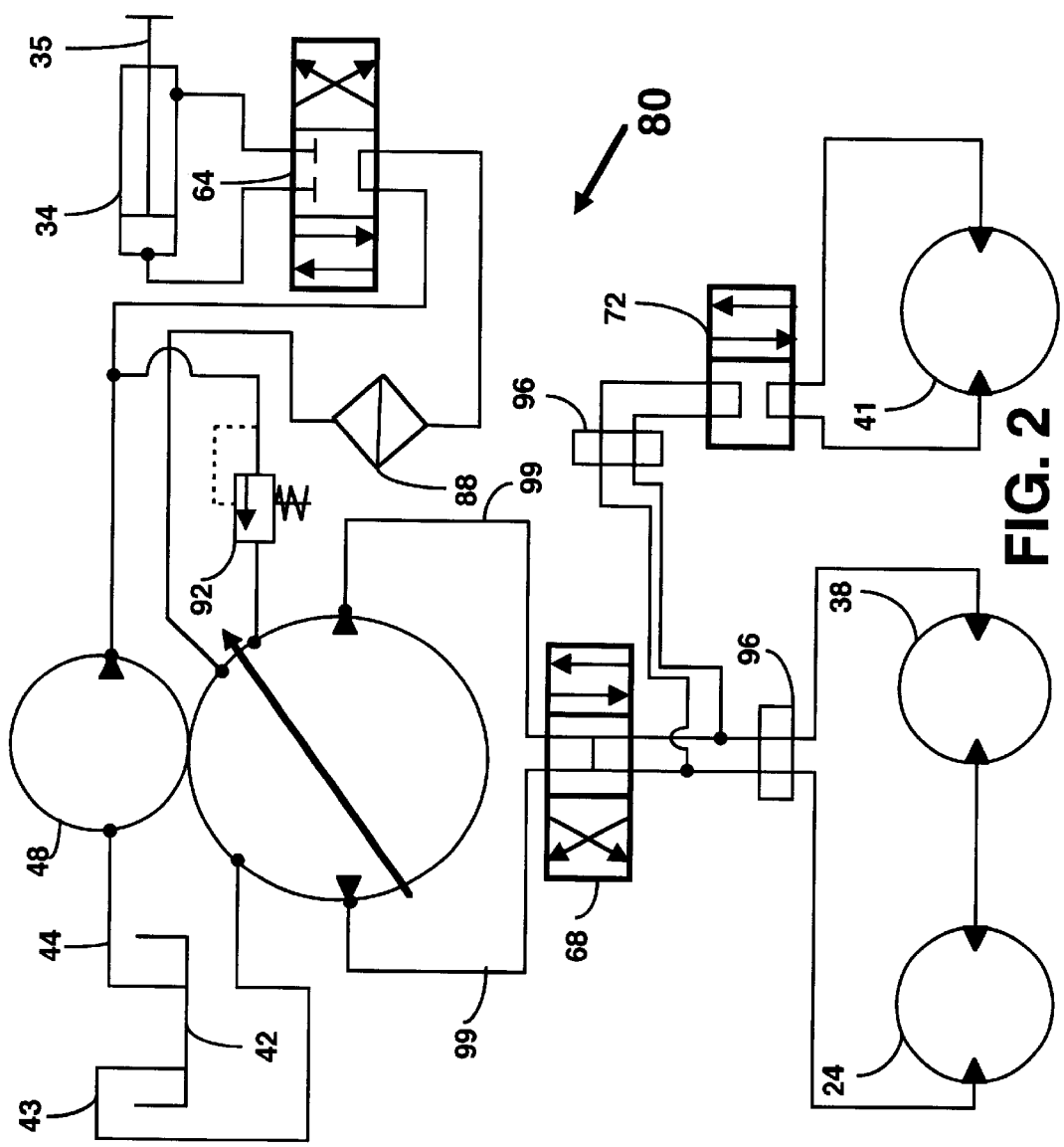
FIG. 2 is a schematic diagram of one embodiment of a hydraulic system for use in the present invention.

FIG. 2 shows one embodiment of the invented vehicle. In this embodiment, hydraulic fluid is stored in a hydraulic tank 42. This hydraulic fluid is supplied to a charge pump 48 through a tank output connection 44. From the charge pump 48, fluid is supplied to the first control or directional valve 64, and to the pump 46 after passing through a pressure relief valve 92. The pump 46 is preferably powered by its connection with the engine of the vehicle.

The preferred first control valve 64 is a three position, four way valve for controlling the hydraulic piston/cylinder 34 and thereby moving the open top dump container 30 from into and out of the dumping position. The hydraulic piston/cylinder 34 drains back through the first control valve 64, through a filter 88 and into the pump 46.

The pump 46 is able to drain back into the hydraulic tank 42 through the tank input connection 43.

From the pump 46 extend pressure and drain lines 99 jointly referred to as "conduit." This conduit 99 passes through the second directional (control) valve 68. This valve 68 is a three position, four way valve for controlling the operation of the hydraulic drive means 24, 38, 41. The three positions of the valve 68 allow the drive means 24, 38, 41 to be driven forward and in reverse and have a neutral position as well.

Figure 3:
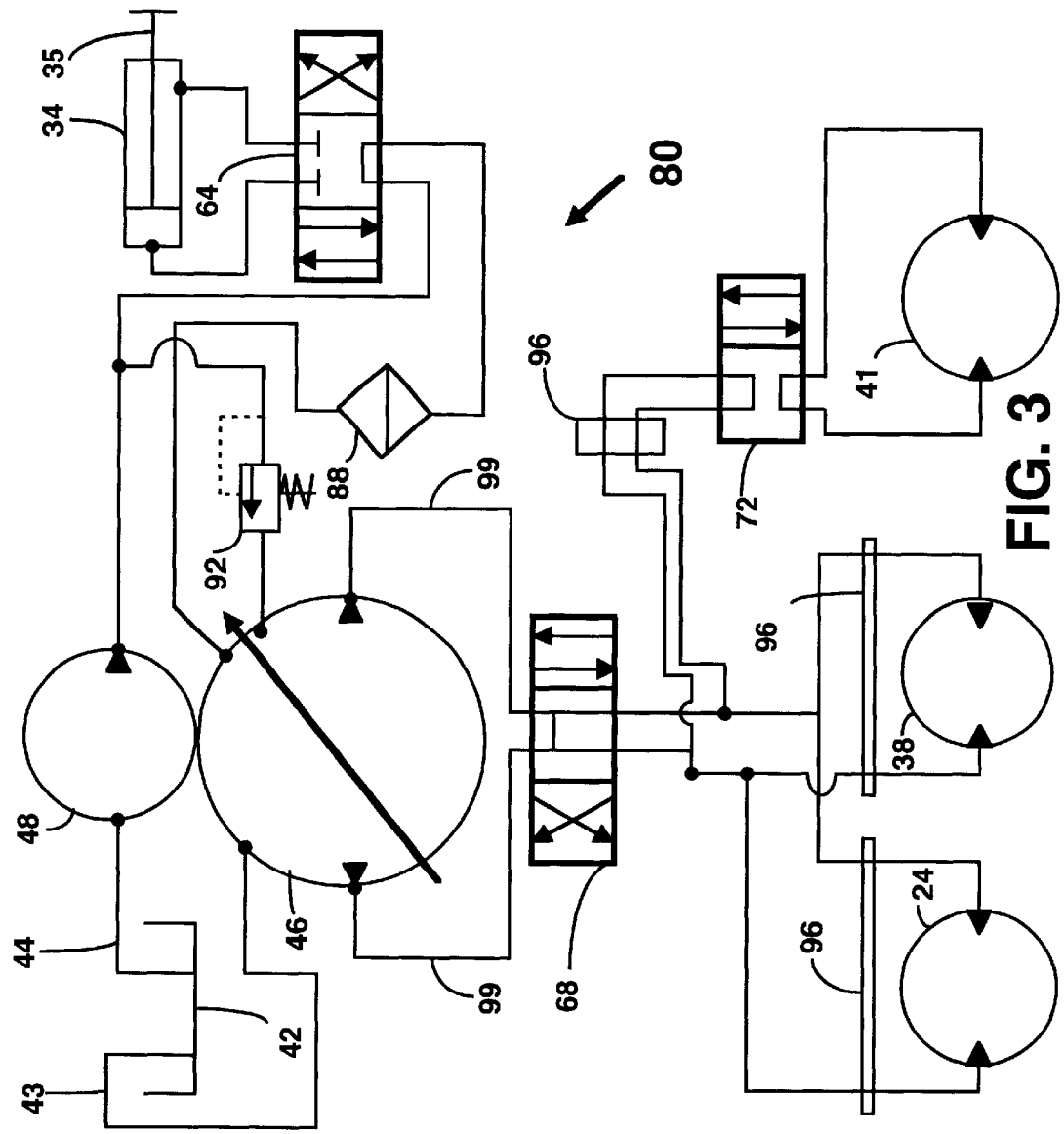
FIG. 3 is a schematic diagram of another embodiment of a hydraulic system for use in the present invention.

FIG. 2 shows the first hydraulic drive means 24 operated in series with the second hydraulic drive means 38, whereas FIG. 3 shows the first hydraulic drive means 24 operated in parallel with the second hydraulic drive means 38. While a first and second drive means 24, 38 are shown, it would also be possible to utilize a single drive means in lieu thereof the preferred pair.

Referring again to FIG. 2, a third directional (control) valve 72 is placed inline between the second directional valve 68 and the third hydraulic drive means 41. This directional valve 72 is a two position, four way valve allowing the third drive means 41 to be engaged and disengaged. Thus, when the third drive means 41 is engaged, the third drive means 41 will drive the rear wheel means 40 in the same direction that the first and second drive means 24, 38 drive the left and right wheel means 26, 28. Thus, the vehicle is able to be used in "two-wheel drive" mode (when the left and right wheel means are driven) and in "allwheel drive" mode (where all wheel means are driven). It is envisioned that the operator will be able to place the device in full-time all-wheel drive mode, as well as having the ability to momentarily switch into all-wheel drive for reasons of traction control, for instance where the front end of the vehicle becomes stuck in loose soil next to a concrete form.

Additionally, individual flow control valves (or a pressure compensating flow divider) 96 may be placed inline to control flow to the drive means 24, 38, 41.

FIG. 3 shows the same general hydraulic system 80 of FIG. 2, except that the front hydraulic drive means 24, 38 are placed in parallel rather than in series.

Figure 4:
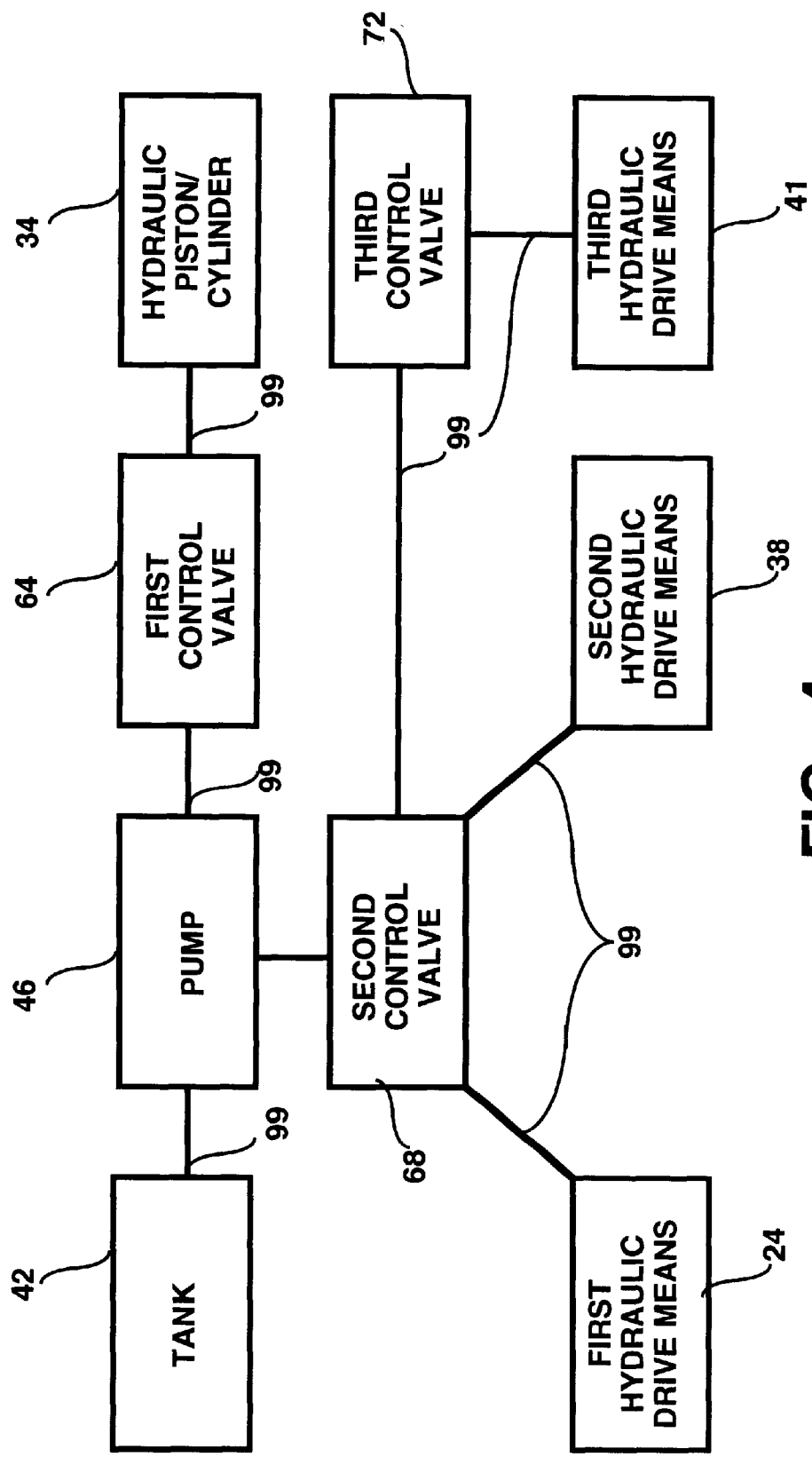
FIG. 4. is a flow chart diagram of another embodiment of a hydraulic system for use in the present invention.

FIG. 4 shows a general overview of another embodiment of the present invention in a flowchart form. In this Figure, conduit 99 is intended to contain pressure and return lines, as needed. The figure shows a hydraulic tank 42 connecting through conduit 99 to the hydraulic pump 46. This pump 46 is powered by an engine (not shown). The pump 46 supplies via conduit 99 a first control valve 64 which operates a hydraulic piston/cylinder 34 for use in dumping the vehicle's dump tub. The pump 46 also connects via conduit 99 to a second control valve 68 which controls forward, reverse and neutral locomotion of the hydraulic drive means 24, 38, 41. Additionally, a third control valve 72 is placed in between the second control valve 72 and the third hydraulic drive means 41. This third valve 72 allows the vehicle 10 to optionally have the third hydraulic drive means 41 driven when the second control valve 68 is driving the first and second hydraulic drive means 24, 38.

As in similar prior art devices, the vehicle 10 readily adapts to walk-behind-type vehicles, riding-step-type vehicles, and seat-riding-type vehicles.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

We claim:

1. In a vehicle comprising: a frame, said frame defining a front end and a rear end of said vehicle, an engine mounted on said frame, a left wheel means driven by a first hydraulic motor, a right wheel means driven by a second hydraulic motor, and a rear wheel means driven by a third hydraulic motor, wherein said vehicle further comprises: a hydraulic system for powering said hydraulic motors, said hydraulic system comprising: a hydraulic fluid tank secured to said frame, said tank having an input connection for receiving and storing hydraulic fluid and an output connection for withdrawing fluid to be pumped; an adjustable dump hydraulic pump mounted on said vehicle and drivingly connected to said engine, said pump having a pump input connection to said output connection of said tank and a pump output connection; and a hydraulic valve and conduit system connected between said pump output connection and said tank input connection including a first lever-controlled valve connected by conduit to said first and second hydraulic motors for forward and reverse driving of said left and right wheel means, and a second lever-controlled valve connected by conduit to said third hydraulic motor for engaging or disengaging said rear wheel means.

2. The vehicle of claim 1 wherein said rear wheel means comprises two independent wheel means.

3. The vehicle of claim 1, wherein said vehicle further comprises a dump container, said dump container being supported on said frame and having a bottom front end portion pivotally mounted on a front end of said frame.

4. The vehicle of claim 3 wherein said vehicle further comprises at least one hydraulic piston/cylinder having one end pivotally mounted on said frame and the opposite end pivotally connected to said container thereof enabling a rear end of said container to be raised and lowered.

5. The vehicle of claim 4 wherein said hydraulic valve and conduit system connected between said pump output connection and said tank input connection further includes a third lever-controlled valve connected by conduit to said piston/cylinder for raising and lowering said dump container.

6. The vehicle of claim 1 wherein said first and second hydraulic motors are connected in series.

7. The vehicle of claim 1 wherein said first and second hydraulic motors are connected in parallel.

* * * * *